US009563755B2

(12) United States Patent
Poiesz (10) Patent No.: US 9,563,755 B2
(45) Date of Patent: Feb. 7, 2017

(54) NFC TRIGGERED TWO FACTOR PROTECTED PARENTAL CONTROLS

(71) Applicant: Google Inc., Mountain View, CA (US)

(72) Inventor: Benjamin Poiesz, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 54 days.

(21) Appl. No.: 13/920,345

(22) Filed: Jun. 18, 2013

(65) Prior Publication Data

US 2014/0373100 A1 Dec. 18, 2014

(51) Int. Cl.
G06F 21/35 (2013.01)
G06F 21/30 (2013.01)
H04L 29/06 (2006.01)

(52) U.S. Cl.
CPC ........... G06F 21/30 (2013.01); G06F 21/35 (2013.01); H04L 63/0492 (2013.01); H04L 63/083 (2013.01)

(58) Field of Classification Search
None
See application file for complete search history.

(56) References Cited

U.S. PATENT DOCUMENTS

| | | | |
|---|---|---|---|
| 6,981,048 B1 * | 12/2005 | Abdolbaghian | H04L 67/14 709/203 |
| 8,191,161 B2 * | 5/2012 | Sanchez | H04W 12/06 726/17 |
| 8,281,366 B1 | 10/2012 | McCorkendale et al. | |
| 2003/0149666 A1 * | 8/2003 | Davies | 705/50 |
| 2003/0163714 A1 * | 8/2003 | Nortung | G06F 21/34 713/189 |
| 2005/0061875 A1 * | 3/2005 | Zai et al. | 235/383 |
| 2009/0317066 A1 * | 12/2009 | Shibasaki | G06Q 20/12 386/241 |
| 2010/0017359 A1 * | 1/2010 | Kiernan | G06Q 10/10 706/58 |
| 2010/0115592 A1 | 5/2010 | Belz et al. | |
| 2011/0223862 A1 * | 9/2011 | Satoh et al. | 455/41.2 |
| 2011/0237221 A1 | 9/2011 | Prakash et al. | |
| 2012/0054856 A1 * | 3/2012 | Johansson | G06F 21/10 726/19 |

(Continued)

FOREIGN PATENT DOCUMENTS

| | | |
|---|---|---|
| CN | 101674367 | 3/2010 |
| WO | 2006058415 A1 | 6/2006 |

(Continued)

OTHER PUBLICATIONS

PCT Search Report, issued in corresponding application No. PCT/US2014/042955 mailed Dec. 1, 2014.

*Primary Examiner* — Michael R Vaughan
(74) *Attorney, Agent, or Firm* — Morris & Kamlay LLP (57) ABSTRACT

Disclosed is a two-factor method for protecting access to content, device functionality accounts and the like through portable devices. A master device may facilitate a subordinate device's access to the on-line account by situating the master device in close proximity to the unauthorized user's portable device. Once within close proximity of one another, the devices may exchange information that may eventually allow the subordinate device to access an account, an application or the like.

20 Claims, 4 Drawing Sheets

(56) References Cited

U.S. PATENT DOCUMENTS

| | | | |
|---|---|---|---|
| 2012/0221464 A1* | 8/2012 | Pasquero et al. ............... | 705/39 |
| 2012/0315848 A1 | 12/2012 | Smith et al. | |
| 2013/0054016 A1 | 2/2013 | Canter et al. | |
| 2013/0152168 A1 | 6/2013 | Nasir et al. | |
| 2014/0344951 A1* | 11/2014 | Brewer ................ | G06F 3/0488 726/28 |

FOREIGN PATENT DOCUMENTS

| | | | | |
|---|---|---|---|---|
| WO | 2006126969 A1 | 11/2006 | | |
| WO | WO 2014143134 A1 * | 9/2014 | ............. | G06F 21/62 |

\* cited by examiner

```
Receiving a notification at a master device that
a subordinate device is attempting to access an     — 210
account

↓

Retrieving, by the master device, information
from the subordinate device using a radio           — 220
frequency reader on the master device

↓

Confirming that the subordinate device is in
close proximity to the master device using the      — 230
radio frequency reader of the master device

↓

In response to a confirmation that the
subordinate device is in close proximity to the
master device, authorizing the subordinate          — 240
device to access the account
```

NFC TRIGGERED TWO FACTOR PROTECTED PARENTAL CONTROLS

BACKGROUND

The use of portable devices to access the Internet, download content, access different types of accounts, such as e-mail, social, digital media content, and to perform electronic on-line purchases is continuing to grow. Controlling the access of these portable devices is commonly performed through some form of password control or account security. For example, a family may have a shared, secure account on a portable device. The secured account may have parental controls to prevent unauthorized purchasing or use of software on the portable device unless authorized by entering a personal identification number (PIN). To prevent unauthorized purchases through the shared account, a parent or other authority may keep the PIN secret. However, a child may obtain the PIN without the parent's knowledge, and may surreptitiously access accounts or make purchases. If not vigilant, a parent may be liable for payments that were never authorized.

BRIEF SUMMARY

According to an implementation of the disclosed subject matter, a process may include receiving a request for access to an application executing on a subordinate device. In a graphical user interface of the subordinate device, an input screen requesting an input code for access to the application may be presented. An indication that a master device is within close proximity to the subordinate device may be obtained via a radio frequency transceiver. In response to receiving the indication that the master device is in close proximity to the subordinate device, the input code may be accepted in the presented input screen of the graphical user interface. Access may be provided to the application on the subordinate device in response to verification that the accepted input code is associated with the application.

According to an implementation of the disclosed subject matter, a process may include receiving a notification at a master device that a subordinate device is attempting to access an account maintained at a server. The master device may retrieve information from the subordinate device using a radio frequency reader on the master device. Using the radio frequency reader on the master device, it may be confirmed that the subordinate device is in close proximity to the master device. The subordinate device may be authorized to access the account in response to a confirmation that the subordinate device is in close proximity to the master device.

Advantageously, the disclosed subject matter provides the benefit of a two-factor authentication process to prevent unauthorized access to a user's on-line account, software package, or other functionality. It may also allow for a parent to monitor the activity of a minor child with respect to the on-line account, software or other functionality. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Disclosed is a two-factor method for protecting access to content, device functionality accounts and the like through portable devices. For example, a subordinate, or unauthorized, (child, student or employee) user may desire to obtain through their device temporary access to an on-line account of a master, or authorized, user (parent, teacher, or administrator). The portable devices of the authorized and unauthorized users may both be equipped with near field communication capabilities. The authorized user may facilitate the unauthorized user's access to the on-line account by situating the authorized user's portable device in near field communication range of, or in close proximity to, the unauthorized user's portable device. Conversely, the unauthorized user may move their device into close proximity of, or in near field communication range of, the authorized user's device. Once within close proximity of one another, the devices may exchange information that may eventually allow the unauthorized device to access the on-line account. Other examples and additional details are provided with reference to FIGS. 1-5.

Figure 1:
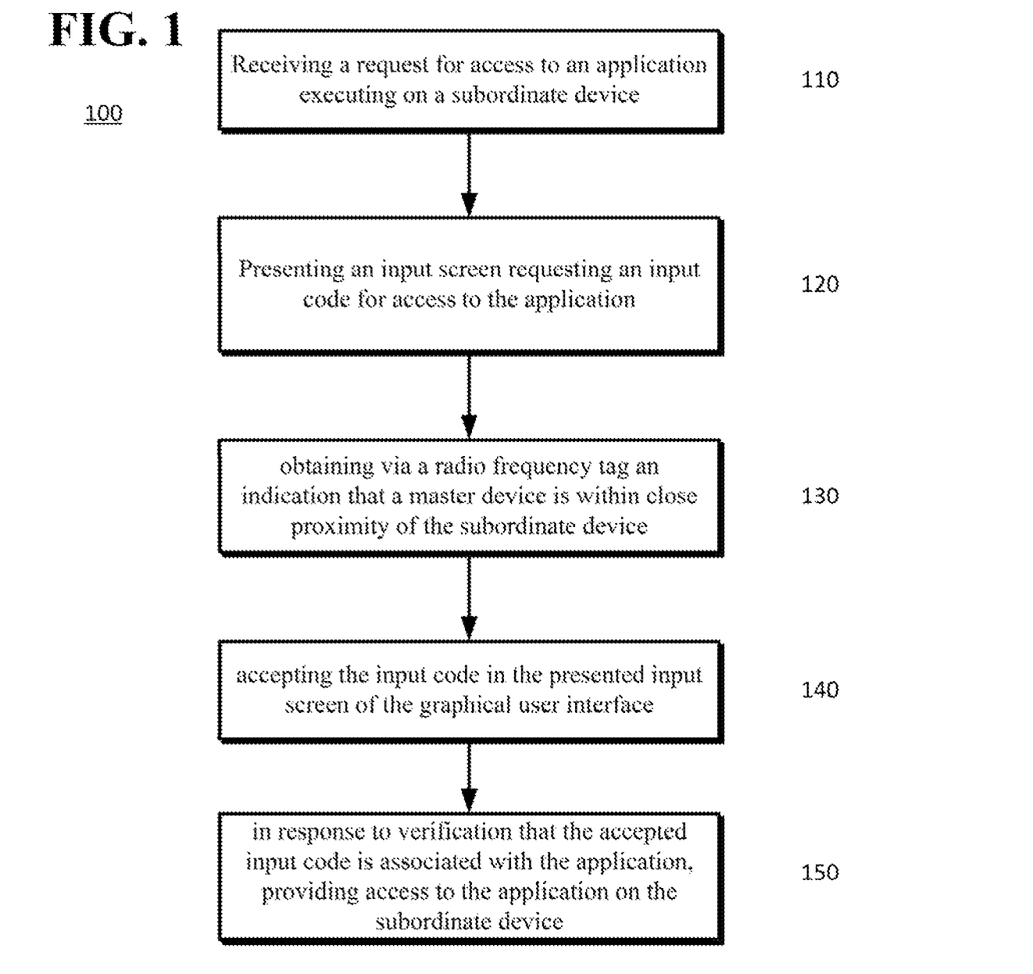
FIG. 1 shows a process flow chart according to an implementation of the disclosed subject matter.

FIG. 1 shows a process flow chart according to an implementation of the disclosed subject matter. The process 100 illustrated in FIG. 1 may be useful, for example, in situations where a child may want to purchase an item from an on-line merchant using a portable device most frequently used by the child, or a student wants to access the Internet on a school-owned tablet or laptop. A device may receive a request for access to an application executing on a subordinate device (110). The device may be a child's device, or the subordinate device. In response to the request, the subordinate device may present an input screen in a graphical user interface requesting an input code for access to the application (120). The subordinate device may receive via a radio frequency transceiver, or tag, an indication that a master device is within close proximity, or within radio frequency tag range, such as 1-15 centimeters, of the subordinate device (130). In general, two devices may be considered to be in close proximity when they are within range of the communication medium used to implement the authorization techniques disclosed herein. For example, when near-field communication techniques are used, two devices may be considered in close proximity to one another when the distance between the devices is within the NFC transceiver range. Based on the indication that the master device is in close proximity to the subordinate device, the input screen will "accept" a correct input code, such as a personal identification number (PIN) (140). In this and the following discussion, "accept" means that the subordinate device may allow an input code to be input into the presented input screen. Using the indication of that the master device is within close proximity to the subordinate device and the accepted input code, the subordinate device or a remote device, such as a server, may verify that the accepted code is associated with the application. In response to verification that the accepted input code is associated with the application, the subordinate device may be able to access the application. Applications may include web browsers, licensed software programs, and the like. Of course, the above described process 100 may be used to allow subordinate devices to gain access to products other than applications. For example, the process 100 may provide access to different types of functionality, such as Wi-Fi, different types of accounts, such as social media accounts, e-mail accounts, digital content distribution accounts, bank accounts and the like.

Figure 2:
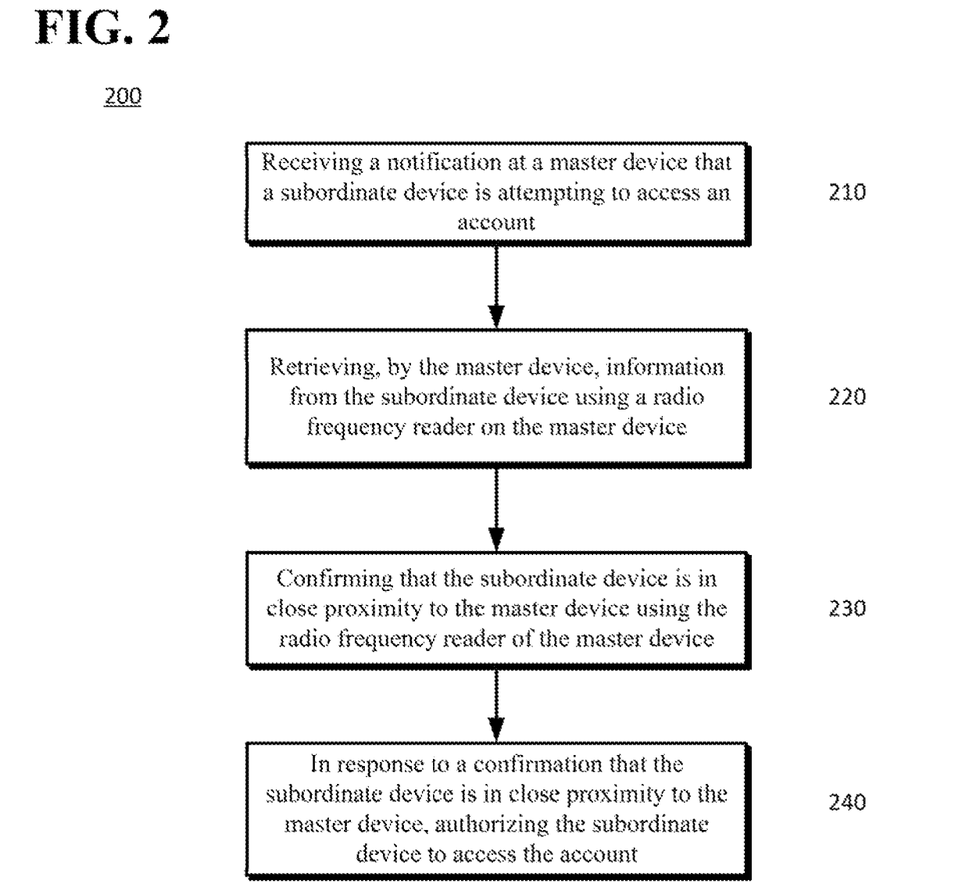
FIG. 2 shows a process flow chart according to an implementation of the disclosed subject matter.

FIG. 2 shows a process flow chart according to an implementation of the disclosed subject matter. In process 200, a master device may receive a notification that a subordinate device is attempting to access an account (210). The account may be maintained at a server, such as a web server or the like that may be remote from the master device (220). The master device may retrieve information from the subordinate device using a radio frequency reader on the master device. The information may include a hash value, a checksum, private-public key information, a personal identification number that can be used to positively identify the subordinate device, or the like. The subordinate device may be confirmed to be in close proximity to the master device using the radio frequency reader on the master device (230). In response to a confirmation that the subordinate device is in close proximity to the master device, the subordinate device may be authorized or permitted to access the account (240).

In more detail, the subordinate device may be identified by obtaining identification information of the subordinate device from the information retrieved from the subordinate device. The subordinate device may be verified as being associated with the master device. For example, an account may list a number of devices that are permitted to access the account, or the master device may have stored in memory identifying information of devices that are subordinate to the master device. As another example, the subordinate device may have been previously provided with a key, password, code, or the like, such as by the master device, which the subordinate device can then provide to the master device to identify the subordinate device as being associated with the master device. In response to a prompt, an authorization code that is determined to be associated with the account may be accepted in a graphical user interface of the master device. In response to the account authorization code being accepted in the graphical user interface of the master device, a message including the identification information of the subordinate device and the authorization code may be generated and transmitted to a server. The generated message may indicate to the server that the subordinate device is permitted to access the account.

The master device may monitor whether the subordinate device is maintained in close proximity to the master device while the subordinate is accessing the account. For example, when monitoring to determine if a subordinate device is maintained in close proximity to a master device, a processor on the master device may signal a master device transceiver to poll the subordinate device transceiver to confirm that the subordinate device is within communication range, such as near field communication range, of the master device. Alternatively, the subordinate device may transmit signals via, for example, near field communication to the master device transceiver of the subordinate device. Of course, other radio frequency communication mediums, such as Wi-Fi™, Bluetooth® or the like may be used. In response to a determination that the subordinate device is no longer in close proximity the master device, the subordinate device's access to the account may be revoked. The revocation may be caused by the master device either directly or indirectly. The master device may receive an indication of account activity by the subordinate device. For example, the indication may be an indication of account activity such as activity that generates a purchase in the account. The master device may have an interface that alerts the master device user of the impending purchase and may require the master device user to allow the purchase to be completed.

Figure 3:
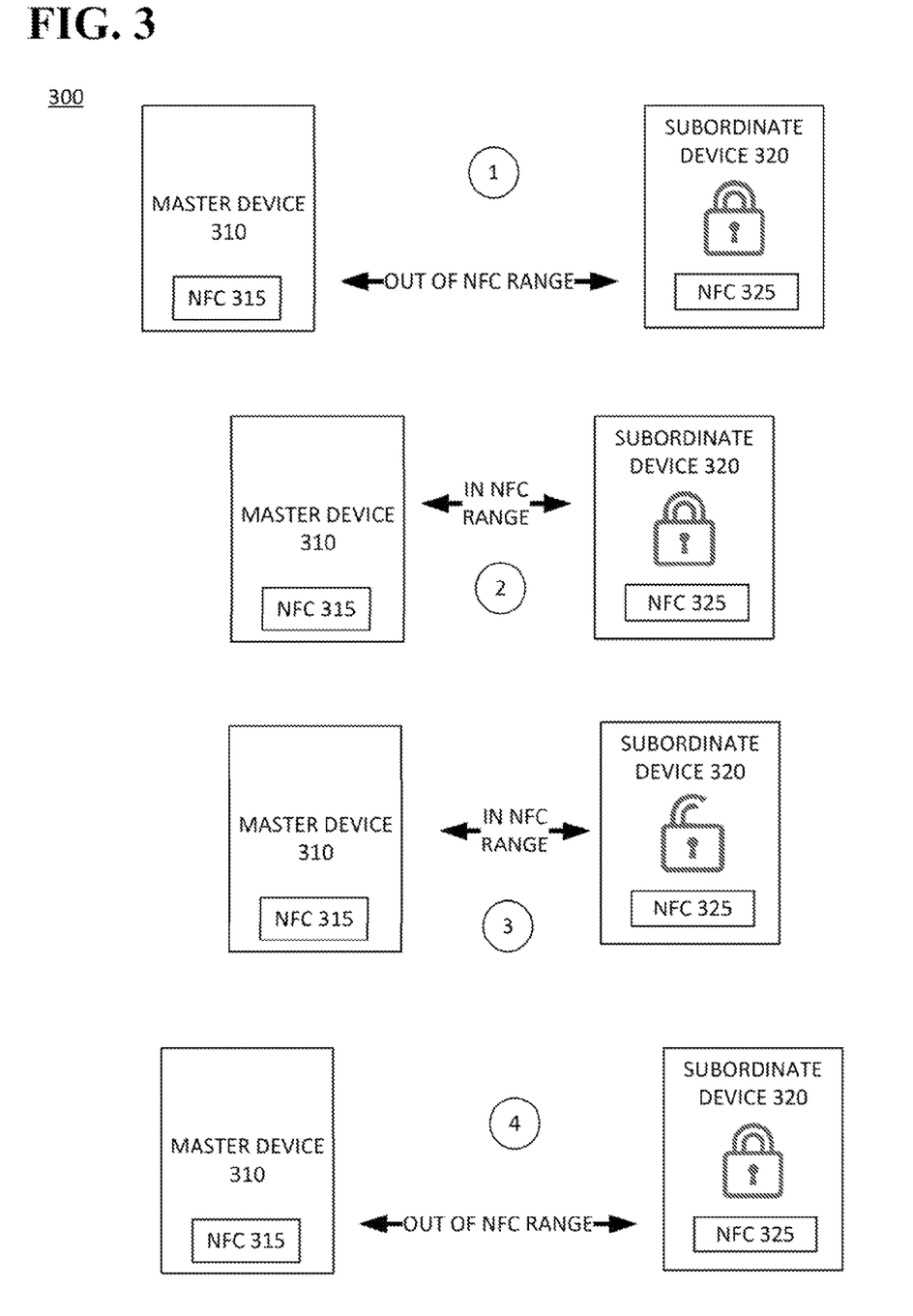
FIG. 3 shows a graphical representation according to an implementation of the disclosed subject matter.

FIG. 3 shows a graphical representation according to an implementation of the disclosed subject matter. A master RF-enabled device 310 and a subordinate RF-enabled device 320 may be provided. The devices 310, 320 may both be portable devices, or one may be a portable device and the other may be a desktop device. Each of the devices 310 and 320 may be capable of accessing a network, such as the Internet. Each device 310, 320 may include transceivers, or tags, such as Wi-Fi™, Bluetooth®, ZigBee®, Z-Wave®, X10®, near field communication (NFC) or the like, that enable the device to exchange signals via radio frequency signaling. At step 1, the devices 310 and 320 may be out of radio frequency (RF) range, such as NFC range, and may be unable to unlock the subordinate device 320. Continuing with a near field communication example, the master device 310 may be placed within NFC range of, or close proximity to, the subordinate device 320 (Step 2), and the subordinate device 320 may be unlocked (Step 3) and authentication information may be exchanged between the admin device 310 and the subordinate device 320. The authentication information may include a user may entering a PIN associated with the account into the subordinate NFC-enabled device 310, the subordinate NFC-enabled device 320, or both.

With the master NFC-enabled device 310 still within NFC range of the subordinate NFC-enabled device 320, the subordinate device 320 may be temporarily authorized to make a purchase from the on-line store or perform some other function that it is not typically enabled to perform. Alternatively, the authorization may persist for a predetermined time (e.g., 5-60 minutes) after the master NFC-enabled device 310 has been moved out of NFC range to the subordinate device 320 and the NFC connection between the devices has been broken.

The master device 310 may maintain a record of locks and unlocks of the account either by maintaining a log of when and how often the PIN is entered or when an acknowledgement of the actual unlocking of a subordinate device 320 has occurred. This allows an authorized user to easily view when the secured account was accessed for comparison to other records, such as a purchase confirmation.

The described process may be used in other environments other than parental control. For example, in business, the system may be used to allow employees to access certain software, data, on-line stores and the like. In an educational environment, it may be used to allow a student to access web sites temporarily to perform research, or allow access to software that is not typically allowed, such as user-licensed software. The disclosed processes may be applied to portable NFC-enabled devices as well as devices, such as PCs or laptops that may be equipped with an NFC communication dongle or similar NFC-enabling device and the appropriate software.

Figure 4:
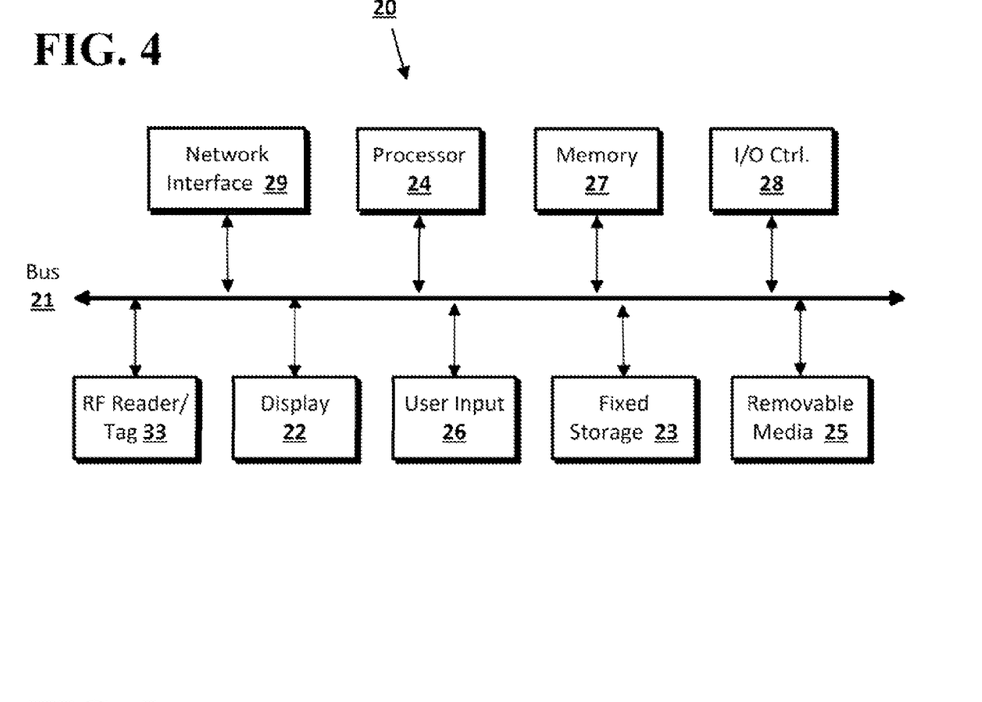
FIG. 4 shows a computer according to an implementation of the disclosed subject matter.

Embodiments of the presently disclosed subject matter may be implemented in and used with a variety of component and network architectures. FIG. 4 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, a removable media component 25 operative to control and receive an optical disk, flash drive, and the like, and a radio frequency (RF) reader or tag 33, such as a near field communication tag reader or tag. The RF tag reader 33 may be under control of the central processor 24 and may store data in the memory 27.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
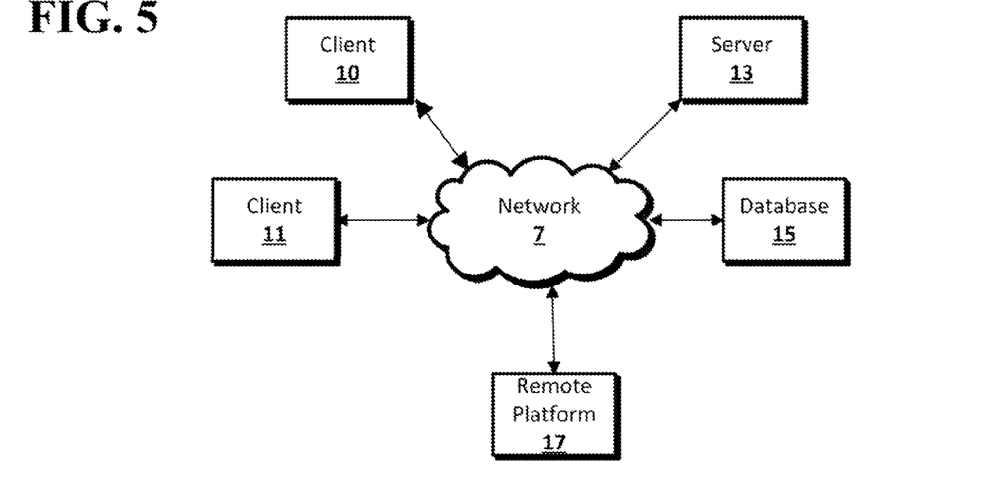
FIG. 5 shows a network configuration according to an implementation of the disclosed subject matter.

FIG. 5 shows an example network arrangement according to an implementation of the disclosed subject matter. One or more clients 10, 11, such as local computers, smart phones, tablet computing devices, and the like may connect to other devices via one or more networks 7. For example, client device 10 may be a subordinate device and client device 11 may be a master device. One or more clients, such as client device 10, may be subordinate to master client device 11. In addition, subordinate client device 10 may subordinate to multiple master devices in addition to master client device 11. Furthermore, master client device 11 may be subordinate to another master client device (not shown). For example, the master client device 11 may be part of a hierarchy of device and may be both a master device and a subordinate device, such a project manager or top-level coordinator that is initially authorized to a fixed station. The fixed station may temporarily authorize other devices within radio frequency range, such as near field communication range. For example, secure data may be accessed by a team, but only a supervisor is initially authorized while in a "secure data room", and others are only authorized while in the room and while the supervisor is also present in the room. Alternatively, a subordinate device may have to be within range of two or more master devices, such as a fixed station in the data room example above, and the supervisor's device. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
   receiving, at a subordinate device, a request for access to an application executing on the subordinate device;
   presenting, in a graphical user interface of the subordinate device, an input screen, the input screen providing an indication of a request for an input code for access to the application;
   in response to the presenting the input screen, obtaining, via a radio frequency transceiver of the subordinate device, an indication that a master device is within close proximity to the subordinate device;
   in response to receiving the indication that the master device is within close proximity to the subordinate device, configuring the subordinate device to allow the input code to be input into the presented input screen of the graphical user interface; and
   in response to a verification that the input code is associated with the application, providing access to the application on the subordinate device.

2. The method of claim 1, further comprising:
   receiving a signal requesting that the subordinate device is in close proximity to the master device.

3. The method of claim 1, further comprising:
   authenticating information read from the radio frequency transceiver with a server.

4. The method of claim 1, further comprising:
   authenticating master device information read from the radio frequency transceiver using information stored on the subordinate device.

5. The method of claim 1, further comprising:
   receiving at the subordinate device a master device input code entered on the master device, wherein the master device input code authorizes the subordinate device to access the application.

6. The method of claim 1, further comprising:
   obtaining authenticating information from the master device via the radio frequency transceiver;
   verifying the master device using the authenticating information;
   obtaining access to the application by the subordinate device based on acceptance of the input code and verification that the master device is an authorized device.

7. The method of claim 6, further comprising:
   transmitting the input code and the authenticating information to a server; and
   receiving an authentication status indicator from the server, wherein the authentication status indicator indicates that the master device is or is not the authorized device.

8. The method of claim 1, further comprising:
   confirming, at the subordinate device, that the input code and authenticating information are associated with the application; and
   confirming that the master device is an authorized device.

9. The method of claim 1, wherein the subordinate device is a first portable network-accessible device and the master device is a second portable network device.

10. The method claim 1, wherein the subordinate device is a desktop network-accessible device and the master device is a portable network-accessible device.

11. The method of claim 1, further comprising:
    presenting a message in the graphical user interface of the subordinate device requesting that the master device be placed in close proximity to the subordinate device.

12. The method of claim 1, wherein the subordinate device is maintained in close proximity to the master device while the application executes on the subordinate device.

13. The method of claim 1, further comprising:
    polling the master device to confirm that the master device is in close proximity to the subordinate device by reading information from a radio frequency transceiver of the master device.

14. The method of claim 13, wherein the radio frequency transceiver of the subordinate device is configured to transmit and receive signals in near field communication frequency ranges.

15. The method of claim 13, wherein the radio frequency transceiver of the subordinate device is configured to transmit and receive signals in at least one of Wi-Fi™ Bluetooth®, ZigBee®, Z-Wave®, or X10®.

16. The method of claim 1, wherein the verification is performed at the subordinate device.

17. The method of claim 1, wherein the presenting the input screen is in response to the request for access to the application executing on the subordinate device.

18. A non-transitory computer-readable medium storing computer code for controlling a processor, the computer code including instructions to cause the processor to:
    receive a request for access to an application executing on the processor;
    present, in a graphical user interface, an input screen, the input screen providing an indication of a request for an input code for access to the application;
    in response to a presentation of the input screen, obtain, via a radio frequency transceiver, an indication that a master device is within close proximity to the processor;
    in response to receipt of the indication that the master device is within close proximity to the processor, configure the processor to allow the input code to be input into the input screen of the graphical user interface; and
    in response to a verification that the input code is associated with the application, provide access to the application on the processor.

19. A first device, comprising:
- a graphical user interface configured to present an input screen, the input screen configured to provide an indication of a request for a first input code for access to an application;
- a radio frequency transceiver configured to obtain, in response to a presentation of the input screen, an indication that a second device is within close proximity to the first device; and
- a processor configured to receive a request for access to the application executing on the first device, to configure the first device to allow, in response to a receipt of the indication that the second device is within close proximity to the first device, the first input code to be input into the input screen of the graphical user interface, and to provide, in response to a verification that the first input code is associated with the application, access to the application on the first device.

20. The first device of claim 19, wherein the processor is further configured to receive a second input code entered on the second device, wherein the second input code is configured to authorize the first device to access the application.

\* \* \* \* \*